United States Patent [19]

Bartsch et al.

[11] Patent Number: 4,525,282
[45] Date of Patent: Jun. 25, 1985

[54] METHOD OF LOADING AND/OR TRANSFERRING ENVIRONMENTALLY HARMFUL MATERIALS IN SHALLOW-WATER AND MUDLAND REGIONS AND ARTIFICIAL ISLANDS SUITABLE THEREFOR

[75] Inventors: Erich O. Bartsch, Buchholz; Gerald Vollstedt, Hamburg, both of Fed. Rep. of Germany

[73] Assignee: Deutsche Texaco Aktiengesellschaft, Hamburg, Fed. Rep. of Germany

[21] Appl. No.: 510,020

[22] Filed: Jul. 1, 1983

[30] Foreign Application Priority Data

Aug. 20, 1982 [DE] Fed. Rep. of Germany ....... 3230927

[51] Int. Cl.³ .................. B01D 17/00; B01D 17/02
[52] U.S. Cl. .................. 210/747; 210/806; 210/170; 405/217; 414/138
[58] Field of Search .......... 210/923, 242.3, 242.1, 210/170, 767, 799, 806, 747; 405/217; 114/258, 264; 414/137, 138

[56] References Cited

U.S. PATENT DOCUMENTS

| | | | |
|---|---|---|---|
| 3,925,991 | 12/1975 | Poche | 210/923 |
| 4,325,656 | 4/1982 | Bishop | 405/217 |
| 4,326,822 | 4/1982 | Oshima et al. | 405/217 |
| 4,350,596 | 9/1982 | Kennedy, Jr. | 210/806 |
| 4,422,400 | 12/1983 | Burke | 414/137 |

Primary Examiner—Richard V. Fisher
Assistant Examiner—Sharon T. Cohen
Attorney, Agent, or Firm—Robert A. Kulason; Robert B. Burns

[57] ABSTRACT

Environmentally harmful liquid or solid materials, especially crude oil of offshore oil fields in mudland and shallow-water regions are loaded and transferred in an environmentally safe manner in lockable basins. For performing the method according to the invention there are provided artificial islands including one or a plurality of basins lockable with barrier means, said basins being in particular equipped with counter-current systems and cleaning equipment. These artificial islands may at the same time be used for crude oil recovery, treatment, storing and processing of the offshore oil fields.

10 Claims, 8 Drawing Figures

Fig.1/1
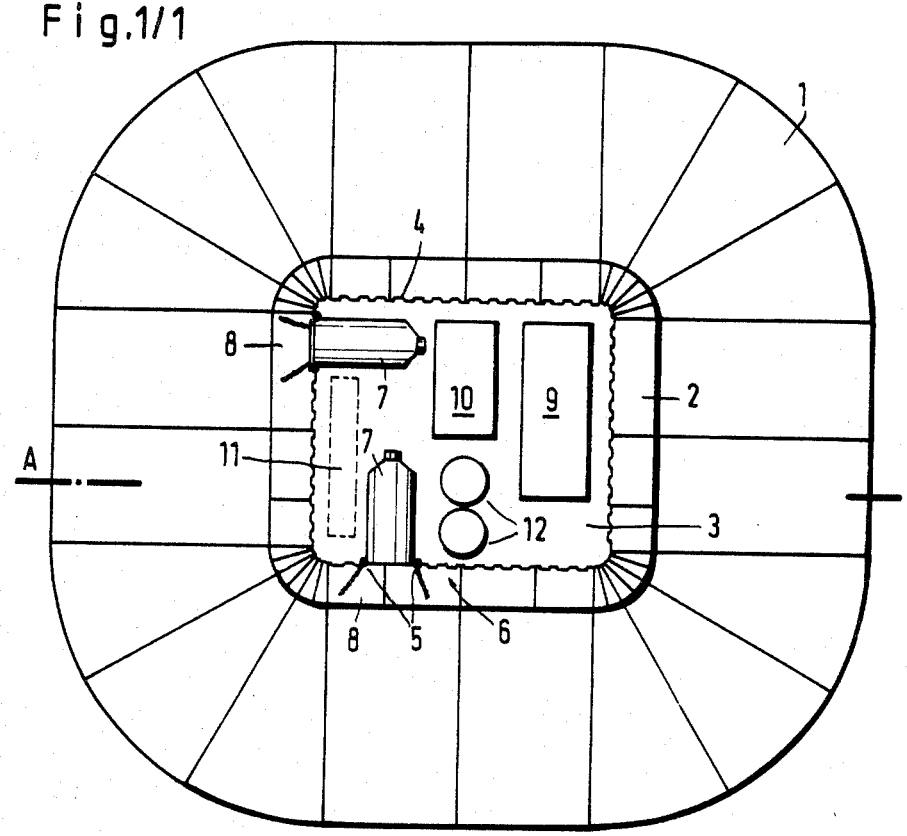
Fig.1/2
- BOULDERS
- COARSE STONE
- SEA SAND
- NON LOAD BEARING SOIL LAYER
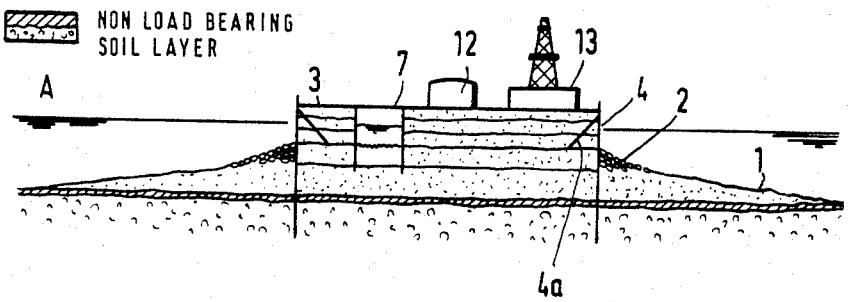

Fig.3/1
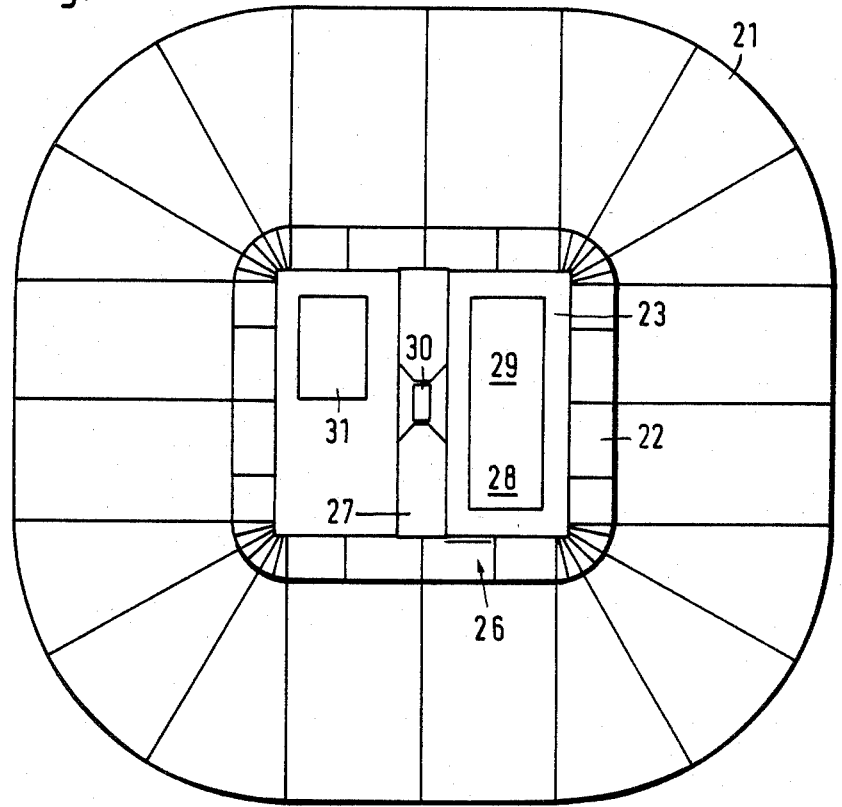
Fig.3/2
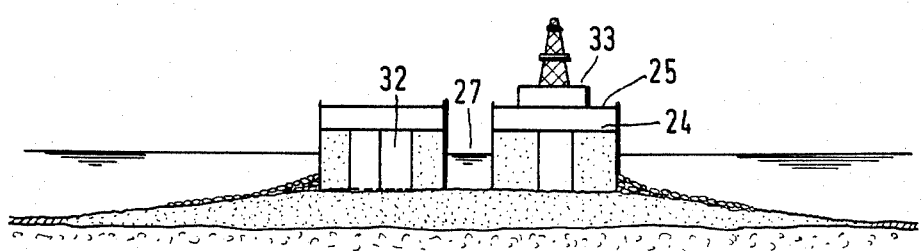

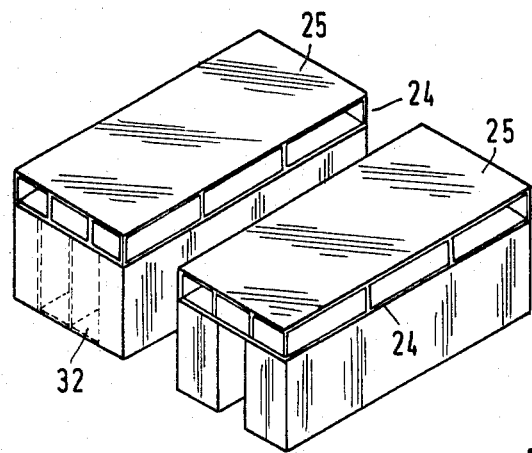
Fig.3/3
Fig.4
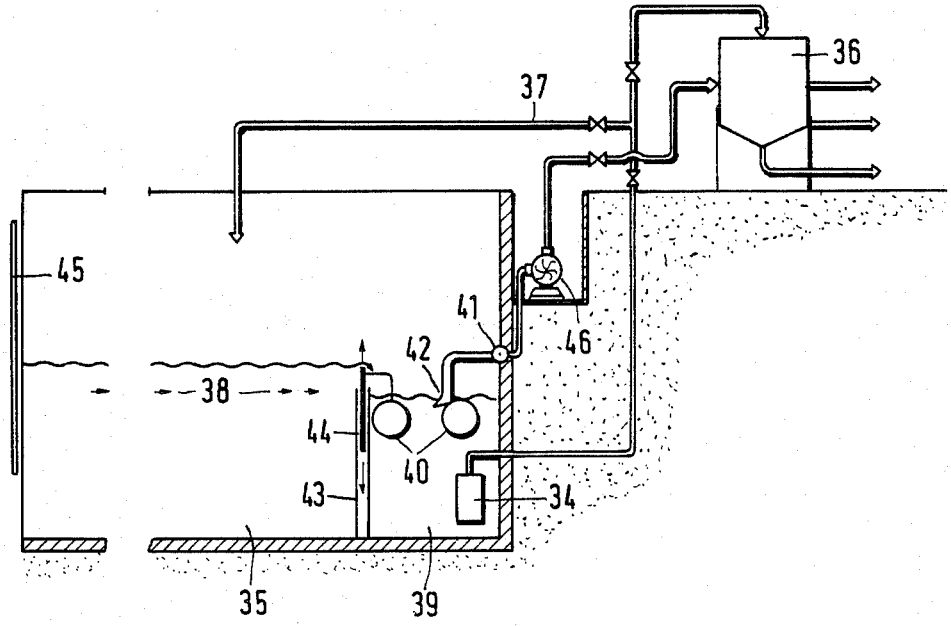

METHOD OF LOADING AND/OR TRANSFERRING ENVIRONMENTALLY HARMFUL MATERIALS IN SHALLOW-WATER AND MUDLAND REGIONS AND ARTIFICIAL ISLANDS SUITABLE THEREFOR

The present invention relates to a method of loading and/or transferring environmentally harmful materials, in particular crude oil, in shallow-water and mudland regions. The invention furthermore relates to lockable harbour basins integrated in stationary artificial islands for loading and/or transfer without harm to the environment. These artificial islands are suitable in mudland and shallow-water areas with a depth of water of up to 30 m either as single installation or as composite installation combined with facilities for the development and the operation of offshore oil fields in shallow-water regions.

Offshore oil technology is concerned with the exploration, i.e., the geology and the geophysics of the formation, the mineral oil exploration, mineral oil recovery and the crude oil transport for the purpose of processing. The initial situation for exploratory and recovery operations in the offshore area is the provision of suitable platforms for drilling, operational and recovery installations and for the shipping or loading of the crude oil.

In offshore projects at mean and greater depths of water, from about 30 m, where bases are frequently remote from the shore, the question of working areas is solved by self-elevating platforms, semi-submersible floating platforms, steel or concrete platforms, and the question of crude oil transport is solved by open ship loading at mooring systems or by crude oil pipelines.

In shallow-water and mudland regions normally the same offshore technology is used as in mean depths of water, shallow-water and mudland regions here being defined as sea areas with depths of water of less than about 10 m, with a transition zone of between about 10 and 30 m. Mineral oil exploration and recovery in these mudland regions are connected with special difficulties. The vicinity of the coast causes increased ecological requirements as to environmentally safe construction and operation relative to drilling, recovery, crude oil transfer and crude oil transport. Because of insufficient draught and because of morphologic restrictions the desired locations are either not accessible, or access is made very difficult for conventional offshore facilities and other heavy equipment. As regards the laying of sea pipelines for the transport of crude oil in mudland areas, conditions are considerably aggravated due to problems of draught and increased risks in case of damage to the pipelines. Laying of and repair work on the pipelines cause interference of morphologic processes especially in mudland regions. The danger to the environment caused thereby prohibits open sea loading via mooring systems with respect to particularly ecologically sensitive coastal areas. As regards petroleum reservoirs of higher-viscosity crude oils, the long-distance pipeline transport of which cannot be ensured either for economic and/or for technical reasons, the simultaneous exclusion of loading of the recovered crude at sea completely prohibits the development of the field.

So far, a defined offshore technology which takes into consideration the amphibic conditions especially of the mudland regions and which might be compared to the classic offshore technology for mean and greater depths of water, has not been developed. This holds particularly with respect to loading and transfer of the crude oil.

It is therefore an object of the present invention to develop a method and installations which permit the safe transfer and transport of such materials without risk to the environment and also permit the operation of facilities used for recovery, treatment and storage of such materials.

To solve the above-specified object, the method of loading and/or transferring environmentally harmful materials in shallow water and mudland regions is characterized in that the transfer and the loading, respectively, is performed on stationary artificial islands in lockable harbour-basins.

For performing this method, stationary artificial islands are provided which are characterized in that they comprise one or several basins or docks adapted to be locked by means of barriers, for the loading and/or the transfer of environmentally harmful materials.

Due to the construction of stationary artificial islands, which serve as combination locations for deflected wells provided for the exploration of mineral oil formations, the working areas are provided for either individual or all installations required for drilling, recovery, processing, storing and shipping of the crude oil and for the environmental safety facilities therefor. Basins or docks, which may be closed by lock gates having sliding, lifting or swinging doors, or other reliable means (e.g. air barriers) and preferably are provided with a counter-current system, are integrated in the artificial islands, and in these basins or docks the shipping of the crude oil to tank barges or tankers takes place without risk to the environment in such a manner that the basins or docks are locked during the loading operation. The basin or dock serves as collecting basin for leaking crude oil. The counter-current system causes a surface current facing away from the sea in the basin towards an oil collecting space, from which escaped crude oil is sucked off for further delivery to a crude oil processing plant and the water is cleaned. Oil fighting means such as steam-jet systems are used to clean the basin walls and oily ship's hulls and completely remove the oil pollution prior to the release of the ships for departure from the harbour-basin.

It is only the method and the constructions according to the present invention which ensure crude oil transfer in shallow-water and mudland regions without harm to the environment by actively secured and visually controlled crude oil loading. It is only thereby that the technical and economic prerequisites for the development and operation of offshore oil fields in mudland and shallow-water regions and the prerequisites for the grant of approval by the authorities are provided.

The concept of constructing artificial islands in shallow-water and mudland regions by economically set-up large-size working areas for installations offers the prerequisite for extensive field development and field operation by the use of the more economic onshore mineral oil technology. The invention furthermore provides the basis towards a considerable reduction in capital costs for the infrastructure of an offshore oil field by a concentration of installations and by eliminating the necessity for laying long-distance pipelines.

The present invention will be described by way of example with reference to the accompanying drawings, in which:

FIG. 1 is a plan view 1/1 showing a composite system including a lockable basin or dock for depths of water of up to approx. 30 m, and a cross-sectional view 1/2 along the line A of 1/1;

FIG. 2 is a top view of a basin or dock adapted to be floated in;

Figure 5:
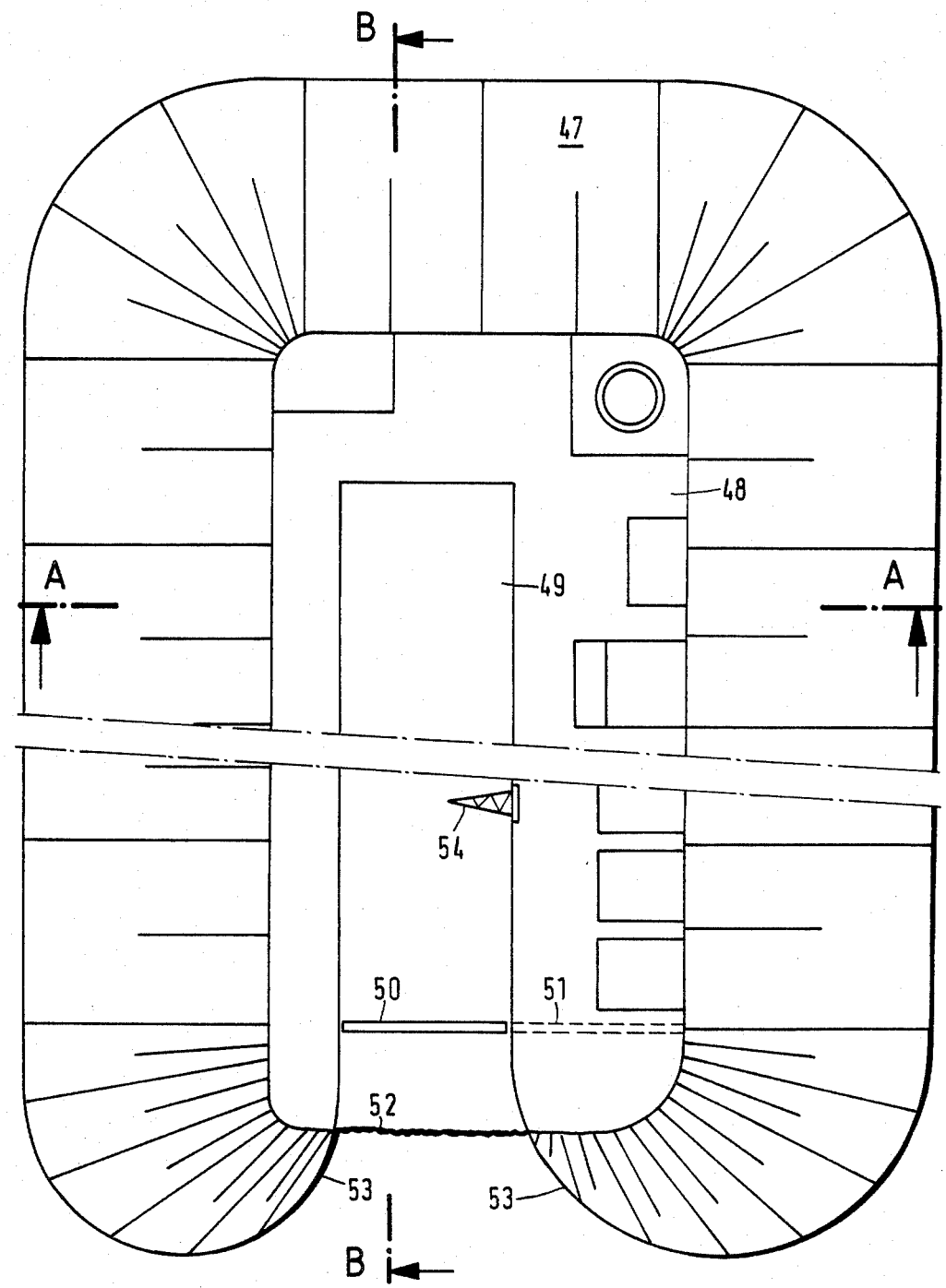

FIG. 3 is a plan view 3/1 showing a composite system including a lockable basin or dock for depths of water of up to approx. 30 m, and a cross-sectional view 3/2 and a caisson array 3/3;

FIG. 4 is a schematic view showing a counter-current system of the basin or dock;

FIG. 5 is a plan view showing a single sea harbour including a lockable basin or dock.

The configuration of the artificial islands, which accommodate the lockable basins or docks, may be of square, polygonal, round or oval layout. Frusto-conical or cubic shapes or combinations thereof are considered as vertical configurations for such an island. The island ramparts may be configured as settled side-slopes, as bulkhead systems, as caissons or as combinations thereof.

The back-filling and ground making of the island interior with sand is performed by hydraulic filling methods and/or mechanical filling methods as well as soil compaction methods in accordance with per se known technical rules, wherein the regulations pertaining to shore structures (dykes, harbour installations, navigation lights) have to be observed. In this connection attention has to be paid to oceanographic criteria such as the forces of wind, waves and ice, wave height, main currents and ice stratification, soil mechanics criteria such as ground facies, soil strength, topography and morphology, criteria of structural analysis, hydrologic criteria, regulations and special rules pertaining to water rights and to rights of navigation, e.g. with respect to ecological and military protected areas.

Number and size of the basins should be determined in accordance with the criteria of size and draught of the barges or tankers employed, the time required for a round-trip of a transport, the amount of crude oil production from the petroleum recovery, and the requirements of a possible choice in case of a shipping accident.

The arrangement of the basins inside the artificial islands should be determined in accordance with topographic conditions relative to the harbour entrance, prevailing winds and wind forces, and the space allocation of the safety areas of the system.

The setting up of the basins may be effected by floating in and placing of prefabricated caissons of concrete or steel into/onto the partially constructed artificial island or by driving in bulkheads as boundary elements for the basins and sinking the basin bottom by washing out or excavation, respectively, and providing scour protection therefor as required.

As a component of the overall installations of an offshore oil field the environmentally safe harbour facilities for the shipping of crude oil in accordance with the present invention may be provided as single facilities, i.e., as operational locations embedded in artificial islands and spatially separated from the remaining offshore oil field installations by the open sea except for communicating field piping, or they may be provided as composite facilities in conjunction with further offshore oil field installations for drilling, recovery, treatment and/or storage.

FIG. 1/1 schematically shows a plan view of a composite system including a lockable basin. By way of example this is an artificial island constructed by the combined use of dykes and bulkheads, wherein the basin is constructed by bulkheads.

To set up such a composite system, the sea bed is initially stabilized as necessary by excavation of non-supporting soil layers. If the bulkheads are driven into natural soil through low-substance non-supporting layers, preparation of the soil by excavation will not always be required.

Then, sea sand from the vicinity is deposited at a flat angle of slope up to the upper boundary area of the quiescent water zone to form a plane island base 1, compacted if necessary by vibratory techniques and covered over with coarse sea gravel in accordance with the requirements for scour protection.

Then, bulkheads 4 are driven around the core area of the island base 1 along the projection of the periphery of the area forming the island deck 3, the length of said bulkheads being determined by the height of construction of the artificial island above sea level and the required fixing in the foundation.

The basin or dock entrances 8 are confined laterally by driven-in lock gate piers 5 which will later serve the purpose of accommodating and deflecting the load of the lock gates 6. For filling up the artificial island with sea sand, the front sides of the basin entrances 8 are temporarily closed by piles and by placing of formwork panels in accordance with the progress of construction work.

Inside of the bulkheads 4 the core of the artificial island is filled or hydraulic-filled with sea sand and compacted up to the intended level of the deck 3, and the bulkheads 4 are tied at 4a as required.

For the scour protection of the surface of the island base 1 in the vicinity of the bulkheads 4 the surface is protected by a scour protection slope of suitable material, which forms the island embankment 2.

Bulkheads 4 having the required dimensions are driven in to bound the basins 7. After removal of the temporary protecting walls in the basin entrance area 8 the packing sand confined within these bulkheads 4 is removed by excavation or washing-out down to the intended depth of the basin bottom, and the latter is provided with a scour protection coating.

The lock gates 6, counter-current systems, oil fighting means and shipping facilities (not shown) are mounted as harbour installations, thus making the sea harbour system ready for operation.

On the thus provided free areas of the deck 3 of the artificial island the technical facilities required by petroleum engineering for drilling, oil recovery, operation, such as the drilling and recovery section 9, the treatment section 10 and the domestic offices section 11, and the crude oil storage space such as tanks 12, which in this example is to be set up on the surface, are assembled in conventional onshore technology. A per se known onshore drilling rig is provided.

As a further composite sea harbour installation for depths of water of up to about 30 m there will be explained, by way of example, an artificial island built according to a dyke construction method including a caisson basin (not explained by drawing). Here, too, the sea bed is initially stabilized as required by excavation of non-supporting soil layers, whereupon sea sand from the vicinity is built up hydraulically and/or mechanically at a flat angle of slope up to the upper limit region of the quiescent water zone of an island base, compacted if required by vibratory methods and covered with coarse sea gravel in accordance with the requirements for scour protection. A ring wall of coarse rock material is deposited on the flat surface of this island base, the inner face thereof is filled with sea sand and compacted to form a plane. This construction step is continued by stepwise offsetting of the ring walls towards the interior of the island, until the sink level of the basins is reached. The outer sides of the ring walls result in a steeper slope 2 according to the design criteria, which is covered towards the sea with blocks of stone or other scour protection materials.

Figure 2:
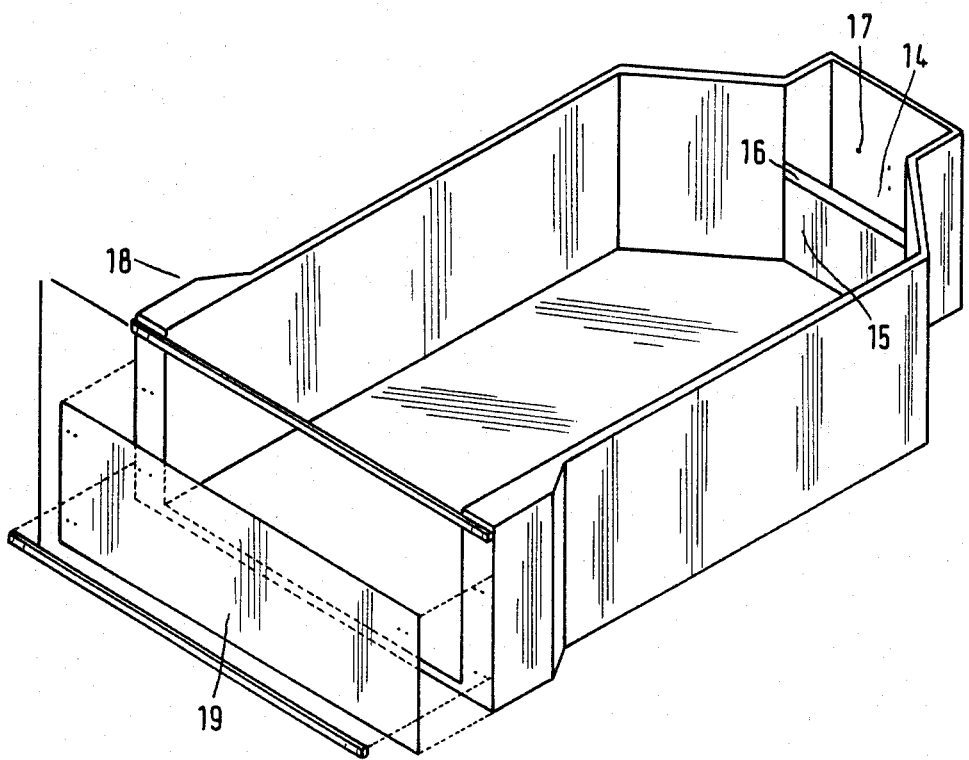

The basins are construction units of the artificial island and are built in dry dock as cubes according to FIG. 2 with an open top and an open end face. The other end face of the basin is equipped with a leakage oil collecting space 14 for removal of water from the basin, the partition 15 of said space 14 being used for level control 16. The rear wall of the leakage oil collecting space 14 is provided with suction pipe passages 17 for accommodating suction tubes for the removal of water from the basin.

For the sea transport of the basins by means of tug-boats the open end face, which is provided with means for receiving the lock gates, such as lock gate guide rails 18, is sealingly closed by means of a steel plate 19. When the location has been reached, the basins are sunk by flooding of the interior relative to the partially erected island at the desired level. By further filling of the basin with sea sand it is possible to represent overloads which are controlled as required. By continued placing of material for the island in accordance with the above described ring wall method the basins 7 are embedded in the filler sand until the plane of the island has reached the intended sink level of the crude oil storage tanks.

The crude oil tanks 12 also are construction units of the artificial island and may be built in dry-dock as closed concrete cylinders, hauled to the location by tug-boats and sunk at the intended level by flooding of the interior relative to the partially constructed island. By filling with sea water the soil-mechanical settling process is accelerated by overload.

Subsequently, the placing of material for the island is continued according to the method explained above (and in the process the crude oil tanks 12 are embedded in the filler sand) until the predetermined island level above sea level is reached with the predetermined size for the support area. An oil-resistant cover on the surface of the artificial island finishes the construction of the artificial island. Thus conditions have been prepared for the subsequent drilling and recovery operations to be performed under onshore conditions and with conventional equipment.

As a last example for a composite sea harbour installation intended for depths of water of up to about 30 m a combined island/caisson-type artificial island will be explained below, in which the basin is formed by the caisson boundary. This embodiment is shown in FIG. 3.

Again, the sea bed is stabilized as required by excavation of the non-supporting soil layers, and sea sand from the vicinity is deposited at a shallow angle of slope up to the upper part of the quiescent water zone or, respectively, as required by the draught of the caissons to be floated in, so that a plane island base 21 is formed, compacted by vibratory methods, and covered with coarse sea gravel as required for scour protection. The plane of the island base 21, i.e, the area required for the caissons, is levelled horizontally. The caisson units of the composite harbour installations (two or more sections) are prefabricated from concrete or steel either in docks or on pontoons as floating bodies. To save space they are preferably designed with double or multiple decks such as lower deck 24 and upper deck 25 to provide parking space for all equipment required for drilling and recovery 29, treatment and shipping 28, domestic offices 31 and crude oil tanks 32 as well as other implements necessary to operate an oil field, which are installed in accordance with technical and economic requirements either partially or chiefly prior to the floating-out of the caissons. Thus, the implements for drilling and recovery, on the one hand, and the equipment for treatment and shipping, on the other hand, may be assembled on different decks.

The finished caisson units are hauled by tug-boats to the location of the island, sunk by flooding of the caisson chambers at such an orientation that a respective sidewall of a caisson or row of caissons forms the lateral boundaries of the basin 27, wherein the width of the basin is determined by the predetermined parallel spacing of the rows of caissons relative to one another. The stabilities in accordance with the constructional embodiment and the conditions of use are obtained as required by filling with sand ballast. In the region of the foundations the caissons are provided with special scour protection.

The oil collecting space 30, which comprises a counter-current system, is sealingly installed as a construction unit so as to abut the caisson walls in the centre of the basin formed by the two rows of caissons and includes a bilaterally effective level controller, whereby two basins for tank barges are provided. When the lock gates have been installed and the counter-current system has been connected, the composite harbour facilities are ready for operation.

Below, a composite sea harbour installation for depths of water of less than 10 m is described by way of example. Such a harbour installation is suitable for mudlands. An aritifical island including a bulkhead-constructed basin is set up.

The outer bulkhead of the artificial island is driven in, tied and scour-protected from a self-elevating construction platform or from a barge-based pile driver of shallow draught, which may, if necessary, settle with its flat bottom on the bed of the mudland. The depth of the outer bulkhead is designed for the deepest scouring to be expected during the life of the island. The height of construction above sea level is up to mean high water plus a sufficient excess to protect against wash-over. By filling the inner space defined by the bulkheads with sea sand from the vicinity and compacting the same a platform is formed from which the artificial island is further constructed in conventional onshore technology. The inner bulkhead, the dimensions of which result from the required excess height relative to the sea and from design statics considerations, is driven in. Between the outer and the inner bulkhead boundary of the artificial island a slope of scour protection material is placed, the interior of the inner bulkhead is filled with filler sand and compacted. Thereupon the bulkhead boundaries of the basins and the harbour outlets as well as the structural piles for the lock gates are driven in. In the region of the entrance into the basins the outer and the inner bulkhead are cut down to sea floor level. The filler sand within the basins is excavated, the bottom of the basins is concreted, the island deck is provided with an oil-resistant coating, and the installations are set up. When the lock gates and the counter-current system according to FIG. 4 have been set up and connected, the sea harbour shipping facility is ready for operation, and the artificial island is prepared for the initiation of the field development.

FIG. 4 describes a possible embodiment of a counter-current system for the basin according to the invention. The counter-current system comprises a pump system 34 with a water return conduit 37, which pump system recycles the water from the basin 35 either direct or via a crude oil separator 36, e.g. a per se known cyclone, whereby by means of level control a surface current 38 of several cm/sec. facing away from the open sea is generated towards the oil collecting space 39 of the basin 35, from the surface of which, in case of an accident, crude oil will be sucked off by a skimmer 42 which is provided with a joint 41 and rises by means of a float 40. The oil collecting space 39 is separated from the basin 35 via a partition 43 which may be provided with a level controller 44.

The shipping of crude oil to tank barges or tankers is performed within the basin with the lock gate 45 being closed. In case of an accident the closed basins function as collecting basins for leaking crude oil. The counter-current system recycles the water from the basin 35 either durect or via the crude oil separator 36 and produces the surface current 38, which faces away from the open sea, when water is taken from the oil collecting space 39 of the basin 35, wherein the leakage oil is sucked from the surface via skimmers 42 through a separate pump system 46, e.g. a centrifugal pump.

To clean basin walls and ships' sides from crude oil adhering thereto after an accident, e.g. steam-jet cleaning units and/or mechanical cleaning systems (not shown) are used which in combination with the use of the counter-current system ensure complete removal of any damage by oil before the ship is released.

In case of an accident the escape of crude oil into the open sea is prevented by the basin being closed by the lock gate, or by any other embodiment of reliable oil barriers for closing the basin entrance, such as e.g. air barriers, hose barriers.

A single sea harbour for loading crude oil in a closed dock or loading basin, respectively, as a feature of the present invention will be described below:

At depths of water of up to about 30 m the sea harbour will be set up in island construction. Apart from the depth of water the type of construction depends on soil parameters, the expected life and environmental conditions such as height of waves, travel of waves, currents, tidal lift and drift ice. Suitable construction types are the shallow foundation in caisson-type construction, the bulkhead construction, hydraulicking, and combinations thereof. These methods have essentially been described above.

FIG. 5 shows a single sea harbour in caisson construction as part of a slope island where bulkheads form the boundaries.

Such a single sea harbour is set up, for instance, by the following construction steps. Bulkheads are driven in to form the island boundary, and are scour protected by rock fill (filter construction). Thereupon piles are driven in and concrete spanning members are set to form the foundation for the basin. The loading basin or dock, which consists of one or several sections, is floated in and sunk. To make the bottom secure and to bound the entrance, bulkheads are driven in, the loading basin is hydraulically backed up with sand, and the slope is stabilized. The bulkhead forming the island boundary is cut off approximately at the the waterline, and the working platform is secured. Then the lock and equipment are assembled. In FIG. 5, 47 is the inclination of the slope, 48 is the working area, 49 is the basin, 50 is the lock gate, 51 is the lock recess, 52 is the bulkhead securing the bottom, 53 is the bulkhead securing the entrance, and 54 are loading means.

A single sea harbour in conventional steel/concrete construction is by way of example set up as follows: Safety walls are driven in and scour protected by rock fill (filter construction). Then, steel or concrete piles are driven in to form the foundation of the loading basin, and bulkheads are driven in to secure the bottom of the basin and bound the entrance. Within the safety walls the water level is lowered beneath the bottom, and the basin bottom and the walls are concreted in the dry building pit with sump drainage. Then the space between basin and safety bulkhead is hydraulically filled with sand. The slope and the working surface are stabilized, and the lock is installed. Then the bulkhead is cut off at the waterline and is removed in the entrance region. Finally, the equipment for loading of oil and for fighting oil pollution is rigged.

The method and the systems according to the present invention are particularly suitable for crude oil transfer and crude oil shipping.

We claim:

1. An offshore transfer facility for loading and/or transferring environmentally harmful materials, to a marine vessel within a protected environment in shallow water and mud land regions which facility comprises;

an artificial island disposed in an offshore body of water, and comprising an earthen foundation which rests on the floor of said body of water, means supported by said foundation, forming an enclosure adapted to floatably accommodate the marine vessel, and being encompassed by said artificial island, means forming a displaceable barrier to said enclosure which in displaced position allows passage of said marine vessel to and from said means forming an enclosure, material handling means on said artificial island being adapted to removably communicate with said marine vessel during a material transfer operation;

and meansfor separating environmentally harmful materials from the water confined within the enclosure.

2. In the facility as defined in claim 1, wherein said earthen foundation includes a reinforced bulkhead which rests on the floor of the body of water.

3. In the facility as defined in claim 1 wherein said water separation means is located on said artificial island having an inlet communicating with said enclosure to remove water therefrom which has been contaminated by contact with said environmentally harmful material, whereby to avoid contact between said environmentally harmful material and the offshore body of water.

4. In the facility as defined in claim 1 wherein said artificial island includes
a bulkhead defining a peripheral wall,
means forming said enclosure within said peripheral wall and having an access gate therein, and
said earthern foundation is formed of a filler material between the bulkhead and said means forming said enclosure.

5. In the facility as defined in claim 4 including an external foundation portion dispossed adjacent to the bulkhead exterior side.

6. In the facility as defined in claim 4 wherein the bulkhead defining said peripheral wall extends downwardly into the floor of the body of water.

7. In the facility as defined in claim 5 wherein said external foundation portion is comprised of an anti-scour slope disposed immediately adjacent to the bulkhead external wall.

8. Method for transfer of environmentally harmful materials in shallow-water and mudland regions from a marine vessel in an offshore body of water, which method includes the steps of providing an artificial island at the offshore site, said island including an internal enclosure having an access way to permit passage of the marine vessel between the enclosure and the body of water, positioning the vessel having environmentally harmful material within the enclsoure, placing a removable barrier across the said access way to avoid a flow of water therethrough when the marine vessel is positioned therein, transferring said material between the vessel and the artificial island and, separating the environmentally harmful material from the water confined within the enclosure, whereby to avoid contact between said material and the offshore body of water external to said removable barrier.

9. Method as defined in claim 8 including the step of treating the water confined within said enclosure to separate the environmentally harmful material therefrom, and returning the treated water to the enclosure.

10. Method as defined in claim 8 including the step of removing the barrier from across the access way to permit egress of the marine vessel from the internal enclosure.

* * * * *